A. E. EBBERT.
CORN HARVESTER AND SHOCKER.
APPLICATION FILED MAR. 25, 1912.
1,037,745.
Patented Sept. 3, 1912.
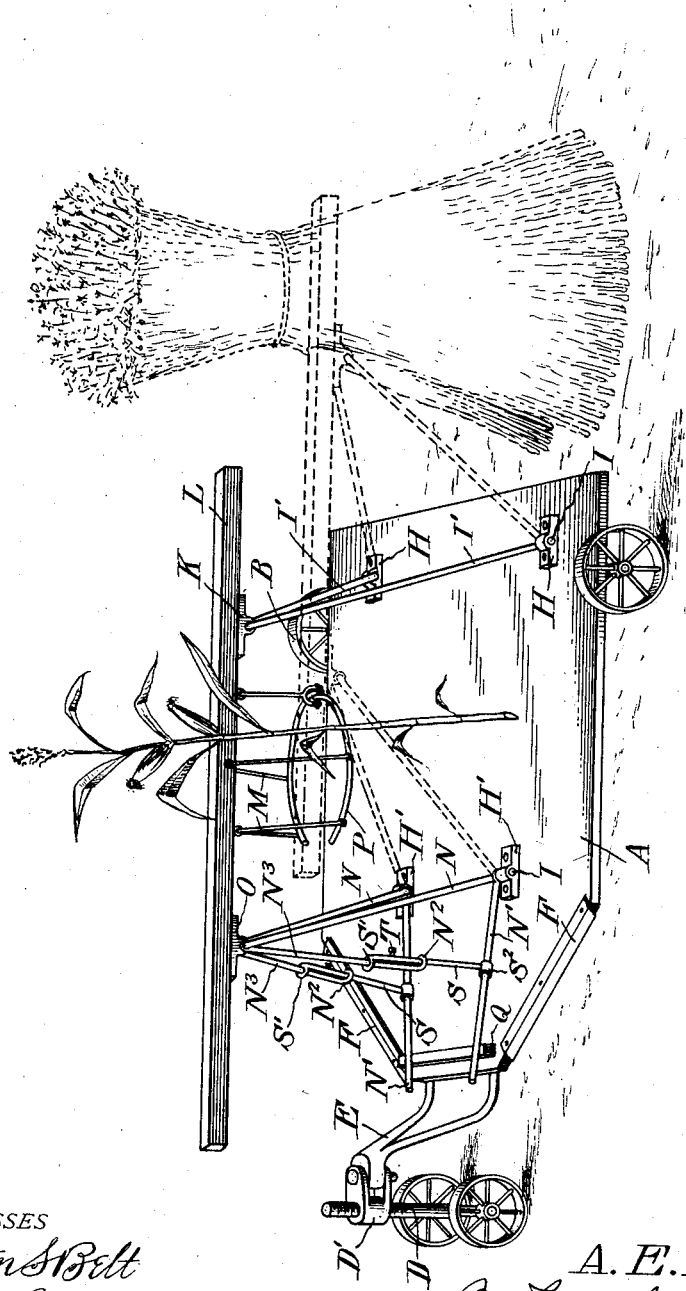
WITNESSES
INVENTOR
A. E. Ebbert
Attorney

UNITED STATES PATENT OFFICE.

ALBERT EVERETT EBBERT, OF GREENCASTLE, PENNSYLVANIA.

CORN HARVESTER AND SHOCKER.

1,037,745.   Specification of Letters Patent.   Patented Sept. 3, 1912.

Application filed March 25, 1912. Serial No. 686,036.

*To all whom it may concern:*

Be it known that I, ALBERT E. EBBERT, a citizen of the United States, residing at Greencastle, in the county of Franklin and State of Pennsylvania, have invented certain new and useful Improvements in Corn Harvesters and Shockers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in corn harvesting and shocking apparatus and comprises a simple and efficient device of this nature having various details of construction and combinations and arrangements of parts which will be hereinafter fully described and then specifically defined in the appended claims.

My invention is illustrated in the accompanying drawing, in which I have illustrated a perspective view of the apparatus, parts being shown in dotted lines to illustrate the position parts would assume in depositing the shock which has been bound up.

Reference now being had to the details of the drawings by letter, A designates a platform mounted upon suitable wheels B upon opposite sides thereof, and a set of caster wheels mounted in a steering head D carrying a yoke D', to which the curved bar E is fastened. Said platform has at its forward end inclined edges to each of which a cutting knife F is fastened. Pivotally mounted upon the blocks H, which rise from the upper surface of the platform, are the angled ends I of the V-shaped bar I' which, at its apex, is pivotally mounted in a bearing block K fastened to the under side of the horizontally disposed beam L. Bearing blocks H' are fastened to the platform at any suitable locations and spaced apart and bars N, having their lower ends I extending in opposite directions, are journaled one in each of said blocks H'. Each bar N is bent at an angle where it has a bearing in a block O and each bar N has a downwardly extending arm $N^3$ with an eye $N^2$ formed at its ends at right angles to the length of said arm. Each bar N is provided with a handle extension N', and S, S designate bars, each having an eye $S^2$ at its lower end and an eye $S'$ at its upper end, said eye $S^2$ receiving a handle extension N', while the other eye $S'$ receives the arm $N^3$, the bar S passing through the eye $N^2$, said eyes serving as guides. Said bars S, having eyes $S^2$ at their lower ends, receive each a handle portion N' of the bar N which handle portion moves freely through said eyes $S^2$ and the upper end of each bar S is provided with an angled end $S'$ which is apertured for the reception of the downwardly projecting portion of the bar N.

Stops T project from the bars S and serve to limit the extensible movements of the bar $S'$ and the downwardly projecting portion $N^3$ of the bar N. It will be noted that there are two of said bars N, of similar construction, each pivotally connected to the beam and two handles, one upon each bar affording means whereby two operators may each cause the apparatus to be operated in the act of depositing a shock of corn upon the ground after having been bound.

Suspended from the beam L by means of cords or rods M is a ring section P, against which and the beam L stalks of corn rest, said ring being provided for the purpose of keeping the bottom of the shock spread when it is being lifted off the platform and placed upon the ground.

The operation of my apparatus will be readily understood and is as follows:—The apparatus being moved over the field of corn and the two cutting knives severing two rows of corn, the operators, one upon either side of the platform, will take the stalks as they are cut and lean them up against the outside of the ring and the beam and, when a sufficient quantity has been accumulated to form a shock, the latter is formed by binding the same and the operators, by taking hold of the handles and raising the same, may cause the beam to swing to the position shown in dotted lines, which will carry the shock rearward and deposit the same upon the ground, after which the parts may be returned to their normal positions for the formation of a new shock. It will be understood that the shock is tied above said ring section and, when the shock has been deposited upon the ground, the operator may reach through to the ring and detach certain of the cords or rods therefrom to allow the ring to drop edgewise, after which, when the apparatus is started up, the ring will be drawn out from the shock, leaving the butt ends thereof spread sufficiently to warrant the shock standing in an upright position.

What I claim to be new is:—

1. A corn harvesting and shocking apparatus, comprising a platform, cutting knives set at inclinations to each other upon the latter, a beam, a ring section suspended from said beam, a V-shaped bar having angled ends which are pivoted to the platform near its rear end, the apex of the bar being pivoted to said beam, bars pivoted to said beam and each having a downwardly projecting arm, each angle bar having a laterally extending portion journaled upon the platform and a handle extension, and connections between each handle extension and arm, as set forth.

2. A corn harvesting and shocking apparatus, comprising a platform, cutting knives set at inclinations to each other upon the latter, a beam, a ring section suspended from said beam, a V-shaped bar having angled ends which are pivoted to the platform near its rear end, the apex of the bar being pivoted to said beam, bars pivoted to said beam and each having a downwardly projecting arm terminating in an eye, each angle bar having a laterally extending portion journaled upon the platform and a handle extension, connections between each handle extension and arm, each of said connections comprising a bar having eyes at its ends, one of which is adapted to receive one of said arms and the other mounted upon the handle extension, the eye upon said arm receiving said bar with eyes at its ends, as set forth.

In testimony whereof I hereunto affix my signature in the presence of two witnesses.

ALBERT EVERETT EBBERT.

Witnesses:
 B. S. STRITE,
 W. A. McKINNIE.

Copies of this patent may be obtained for five cents each, by addressing the "Commissioner of Patents, Washington, D. C."